United States Patent
Nam et al.

(10) Patent No.: US 9,632,645 B2
(45) Date of Patent: Apr. 25, 2017

(54) TOUCH SENSING APPARATUS AND METHOD

(71) Applicant: SAMSUNG DISPLAY CO., LTD., Yongin, Gyeonggi-Do (KR)

(72) Inventors: Hui Nam, Yongin-si (KR); Joon Hak Oh, Seoul (KR); Jong Seo Lee, Yongin-si (KR); Beom Shik Kim, Yongin-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/464,203

(22) Filed: Aug. 20, 2014

(65) Prior Publication Data

US 2015/0205415 A1 Jul. 23, 2015

(30) Foreign Application Priority Data

Jan. 22, 2014 (KR) .................. 10-2014-0007805

(51) Int. Cl.
*G06F 3/041* (2006.01)
*G06F 3/046* (2006.01)
*G06F 3/044* (2006.01)

(52) U.S. Cl.
CPC .............. *G06F 3/046* (2013.01); *G06F 3/044* (2013.01); *G06F 3/0416* (2013.01); *G06F 2203/04106* (2013.01)

(58) Field of Classification Search
USPC .............. 345/174, 179, 173, 175; 178/18.01
See application file for complete search history.

(56) References Cited

U.S. PATENT DOCUMENTS

| 5,834,709 A * | 11/1998 | Blonder ................. B82Y 25/00 |
| | | 178/18.01 |
| 2012/0154327 A1* | 6/2012 | Liu ........................ G06F 3/0412 |
| | | 345/174 |
| 2012/0188195 A1* | 7/2012 | Fang .................. G01R 31/2832 |
| | | 345/174 |
| 2013/0009907 A1* | 1/2013 | Rosenberg .............. G06F 3/046 |
| | | 345/174 |
| 2013/0016073 A1* | 1/2013 | Lee ...................... G06F 3/03545 |
| | | 345/179 |
| 2014/0043283 A1* | 2/2014 | Kim ..................... G06F 3/0416 |
| | | 345/174 |

FOREIGN PATENT DOCUMENTS

| KR | 10-2011-0030188 A | 3/2011 |
| KR | 10-2011-0127107 A | 11/2011 |
| KR | 10-2013-0009834 A | 1/2013 |
| KR | 10-2013-0100933 A | 9/2013 |

* cited by examiner

*Primary Examiner* — Thuy Pardo
(74) *Attorney, Agent, or Firm* — Lee & Morse, P.C.

(57) ABSTRACT

A touch sensing apparatus includes a plurality of magnetic sensor patterns coupled to a first substrate, and a plurality of conductive patterns corresponding to the magnetic sensor patterns. Each of the magnetic sensor patterns sense a change in a magnetic field caused by a touch input.

21 Claims, 16 Drawing Sheets

TOUCH SENSING APPARATUS AND METHOD

CROSS-REFERENCE TO RELATED APPLICATION

Korean Patent Application No. 10-2014-0007805, filed on Jan. 22, 2014, and entitled, "Touch Sensing Apparatus and Method," is incorporated by reference herein in its entirety.

BACKGROUND OF THE INVENTION

1. Field

One or more embodiments described herein relate to a touch sensing apparatus and method.

2. Description of the Related Art

Touch screens have been used in a variety of devices including mobile phones and smartphones. Touch screens may be classified as resistive, capacitive, ultrasonic, and infrared according the way they operate. Capacitive touchscreens have excellent durability and long life, and also supports multi-touch functioning.

A capacitive touch screen detects the position of a touch (e.g., the finger of a user) based on a change in capacitance. Some touch screens can detect sliding inputs. However, capacitive touch screens cannot detect a change in capacitance (and thus a touch) caused by a stylus pen. Thus, electro-magnetic resonance (EMR) sensor pads have been installed in touch screen in order to detect touches from an EMR stylus pens.

SUMMARY

In accordance with one embodiment, a touch sensing apparatus includes a first substrate; a plurality of magnetic sensor patterns coupled to the first substrate, each of the magnetic sensor patterns to sense a change in a magnetic field caused by a touch input; and a plurality of conductive patterns corresponding to the magnetic sensor patterns. The apparatus may include a controller to determine whether the touch input has occurred based on the change in the magnetic field.

The controller may obtain a sensing voltage generated by the magnetic sensor patterns based on the change in the magnetic field, and determine whether the touch input has occurred based on the sensing voltage. The controller may determine that the touch input has occurred when an alternating current component of the sensing voltage exists for more than a preset period of time. The change in magnetic field maybe based on a change in capacitance of the conductive patterns caused by the touch input.

The controller may determine the touch input to be a hand touch input when the AC component of the sensing voltage exists for more than the preset period of time. The controller may determine that the touch input has occurred when a size of the sensing voltage is equal to or greater than a preset threshold value. The change in magnetic field may be based on a magnetic field generated by the touch input.

The controller may determine the touch input to be a pen touch input when the sensing voltage is generated for more than a preset period of time.

The apparatus may include a read-out line to electrically connect each of the magnetic sensor patterns to the controller. The apparatus may include an input power line to provide power to the magnetic sensor patterns. The apparatus may include a driving power line to provide driving power to the conductive patterns. Each of the magnetic sensor patterns may include a magneto-resistance device or a hall-resistance device.

The apparatus may include a second substrate facing the first substrate, wherein the conductive patterns are coupled to a surface of the second substrate. The apparatus may include an insulating layer between the first substrate and the second substrate.

In accordance with another embodiment, a touch sensing method includes obtaining a sensing voltage based on a change in a magnetic field caused by a touch input; and determining whether the touch input has occurred based on the sensing voltage. Determining whether the touch input has occurred may include determining that the touch input has occurred when an AC component of the sensing voltage exists for more than a preset period of time.

Determining whether the touch input has occurred may include determining the touch input to be a hand touch input when the AC component of the sensing voltage exists for more than the preset period of time.

Determining whether the touch input has occurred may include determining that the touch input has occurred when a size of the sensing voltage is equal to or greater than a preset threshold value.

Determining whether the touch input has occurred may include determining the touch input to be a pen touch input when the size of the sensing voltage is equal to or greater than the preset threshold value.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
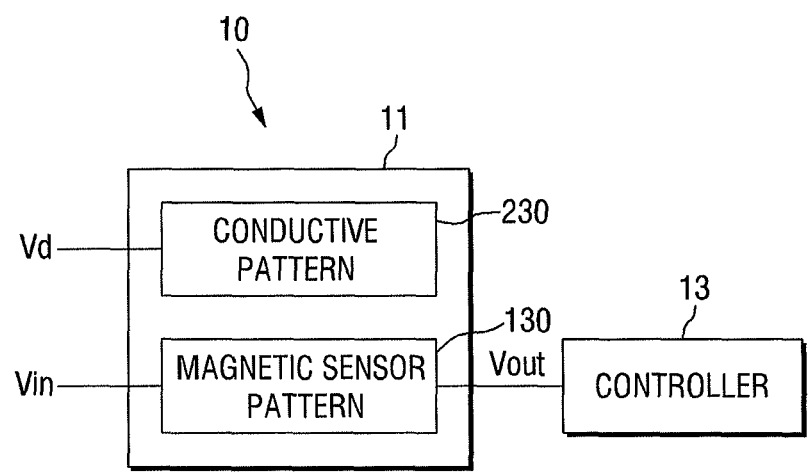
FIG. 1 illustrates an embodiment of a touch sensing apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a touch sensing apparatus 10 which includes a touch sensing panel 11 and a controller 13. The touch sensing panel 11 includes one or more magnetic sensor patterns 130 and one or more conductive patterns 230.

The conductive patterns 230 receive a driving voltage Vd and change capacitance in response to a touch input, e.g., by a user's finger. In one embodiment, the conductive patterns 230 may receive the driving voltage Vd from controller 13. In other embodiments, the conductive patterns 230 may receive the driving voltage Vd from a driving power source.

The magnetic sensor patterns 130 receive input power and sense a change in an external magnetic field based on the input power. In one embodiment, each magnetic sensor pattern 130 receives an input voltage Vin as input power and generates an output voltage Vout based on a change in the input voltage Vin caused by a change in the magnetic field. Each magnetic sensor pattern 130 provides the output voltage Vout to controller 13. The input power to the magnetic sensor patterns 130 may vary according to the type of magnetic sensor patterns 130. Also, in one embodiment, the input power may be a current. The input power may be received from the controller 13. In another embodiment, the input power may be received from a power source.

The controller 13 may control the overall operation of the touch sensing apparatus 10. In one embodiment, the controller 13 determines whether a touch event has occurred based on a change in the magnetic field sensed by one or more of the magnetic sensor patterns 130. The controller 13 may obtain a sensing voltage based on the output voltage Vout of each magnetic sensor pattern 130, and determine whether a touch event has occurred based on the sensing voltage. The sensing voltage may be, for example, a component of input voltage Vin distributed to the magnetic sensor patterns 130. For example, the sensing voltage Vs may be determined by the following equation: Vs=Vin−Vout.

Figure 2:
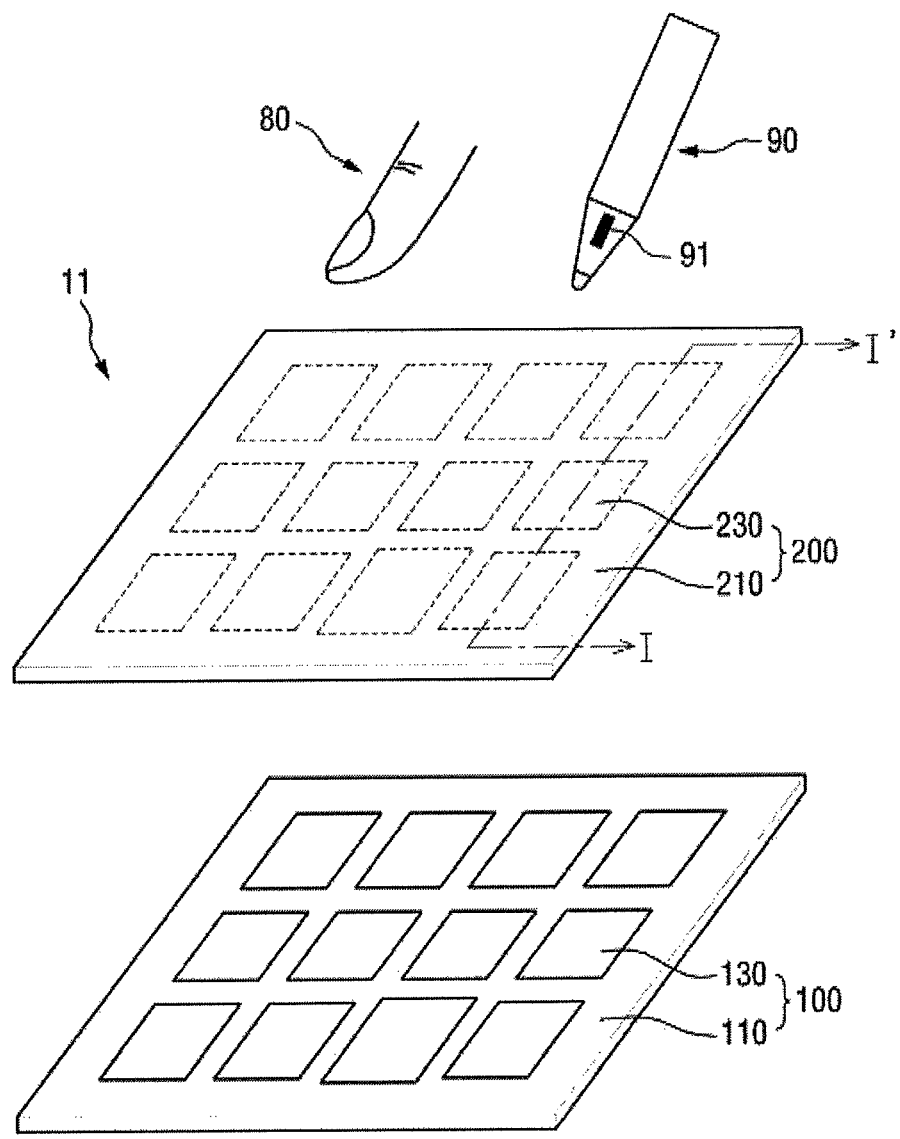
FIG. 2 illustrates an embodiment of a touch sensing panel.
Figure 3:
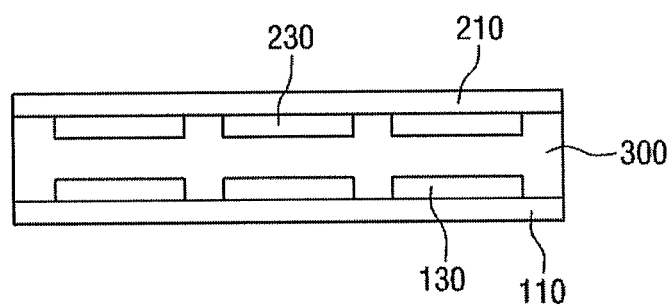
FIG. 3 illustrates the touch sensing panel along section line I-I' in FIG. 2.
Figure 4:
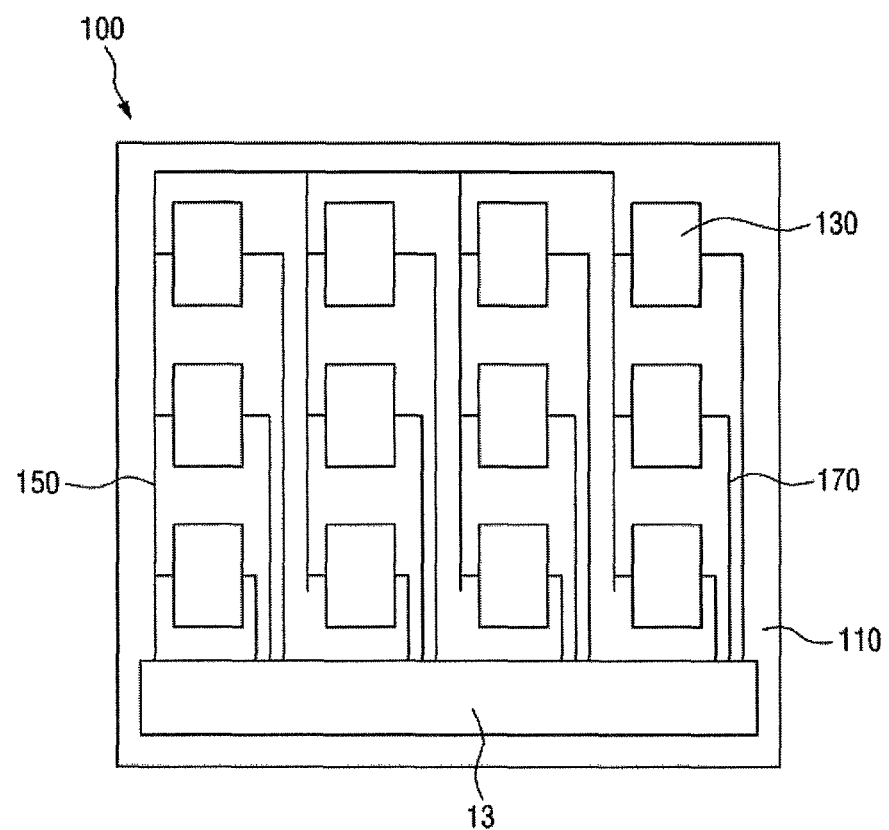
FIG. 4 illustrates an embodiment of a magnetic sensor array substrate.
Figure 5:
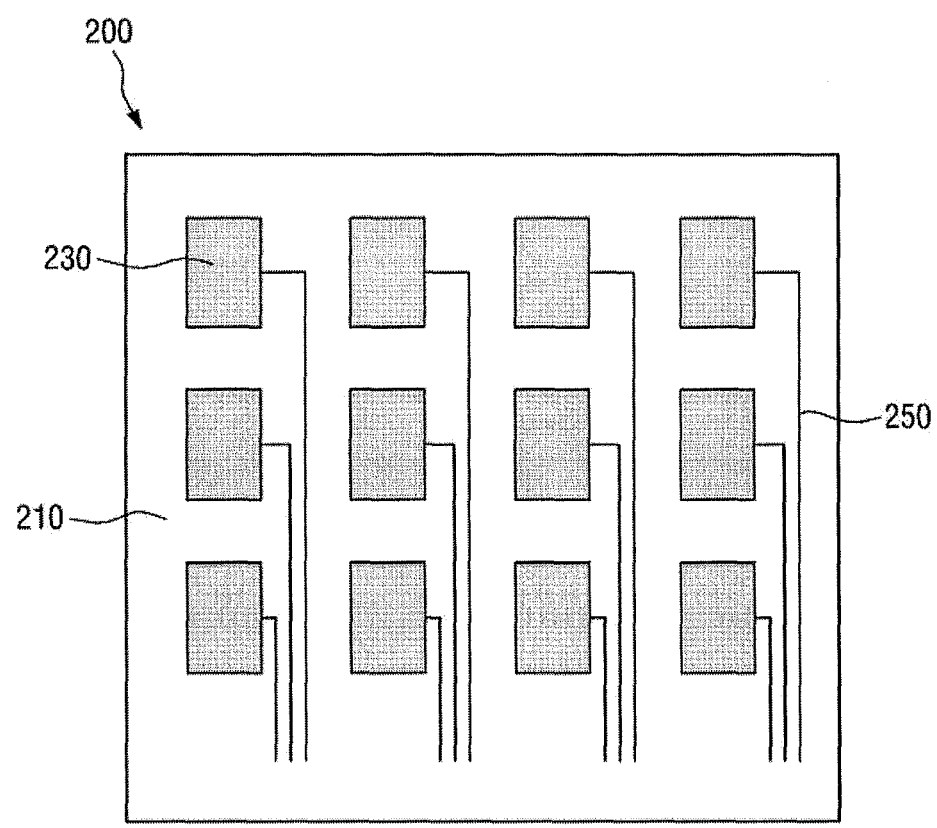
FIG. 5 illustrates an embodiment of a conductive pattern array substrate.

FIG. 2 is an exploded view illustrating a schematic configuration of an embodiment of touch sensing panel 11 in FIG. 1. FIG. 3 illustrates a cross-sectional view of the touch sensing panel 11 taken along the line I-I' of FIG. 2. FIG. 4 illustrates a structure of magnetic sensor array substrate 100 of FIG. 2. FIG. 5 illustrates a structure of a conductive pattern array substrate 200 of FIG. 2.

Referring to FIGS. 1 through 5, touch sensing panel 11 may include a magnetic sensor pattern array substrate 100 facing a conductive pattern array substrate 200. The magnetic sensor array substrate 100 may include a plurality of magnetic sensor patterns 130 on a first substrate 110.

The first substrate 110 may be made of an insulating material and a transparent material. In addition, the first substrate 110 may be a flexible substrate or a rigid substrate. In some embodiments, the first substrate 110 may be made of polyimide (PI), polycarbonate (PC), polyethylene terephthalate (PET), polyethersulfone (PES), polyethylene naphthalate (PEN), metal foil, or fiber reinforced plastic (FRP). Alternatively, the first substrate 110 may be made of a glass material, a sapphire material, or a quartz material.

The magnetic sensor patterns 130 may be disposed on the first substrate 110. The magnetic sensor patterns 130 may sense a magnetic field and may be arranged on the first substrate 110 in row and column directions. In the embodiment illustrated in FIG. 2, the magnetic sensor patterns 130 are arranged in a 3×4 matrix. The magnetic sensor patterns 130 may be arranged in a different pattern in other embodiments.

Each magnetic sensor pattern 130 may have a variety of shapes. For example, each magnetic sensor pattern 130 has a quadrilateral or other planar shape. In another embodiment, the magnetic sensor patterns 130 may be any one of a triangle, a polygon, a circle, a semicircle and an oval, or a combination of these shapes.

In one embodiment, each of the magnetic sensor patterns 130 may generate an output voltage which changes according to a change in magnetic field. Each of the magnetic sensor patterns 130 may be a magneto-resistance device having a resistance that changes by a magnetic field or a hall-resistance device which uses a hall effect. In other embodiments, each of the magnetic sensor patterns 130 may be a device that can sense a change in the magnetic field. For illustrative purposes, a case where each of the magnetic sensor patterns 130 is a magneto-resistance device will be described.

The magnetic sensor patterns 130 may be attached to first substrate 110 by an adhesive material. Alternatively, the magnetic sensor patterns 130 may be formed directly on the first substrate 110 by laminating or coating.

In one embodiment, the controller 13 may be disposed on first substrate 110. For example, the controller 13 may be mounted on first substrate 110 in the form of chip-on-glass (COG) or chip-on-board (COB). Alternatively, the controller 13 may be mounted on a flexible printed circuit board (FPCB).

An input power line 150 may be disposed on the first substrate 110 and electrically connected to each of the magnetic sensor patterns 130. The input power line 150 may deliver input power (e.g., input voltage Vin) to each of the magnetic sensor patterns 130. In one embodiment, the input power line 150 electrically connects each of the magnetic sensor patterns 130 to the controller 13. In the drawings, only one portion of the input power line 150 is illustrated as being connected to the controller 13. However, this is merely an example, and multiple portions of input power line 150 may be connected to the controller 13 in other embodiments. For example, the shape and placement of the input power line 150 are not limited to a particular shape and placement and can be changed from the shapes and placements shown in the drawings.

A plurality of read-out lines 170 may be disposed on the first substrate 110 and may be electrically connected to the magnetic sensor patterns 130, respectively. The read-out lines 170 may deliver output power (e.g., output voltages Vout) of the magnetic sensor patterns 130 to the controller 13. In one embodiment, the read-out lines 170 may electrically connect the magnetic sensor patterns 130 to the controller 13.

The conductive pattern array substrate 200 may be disposed on the magnetic sensor pattern array substrate 100. In one embodiment, the magnetic sensor pattern array substrate 100 may be bonded to the conductive pattern array substrate 200, for example, by an adhesive material such as an optical clear adhesive (OCA). The adhesive material may be placed only on edges of the magnetic sensor pattern array substrate 100 or the conductive pattern array substrate 200. Alternatively, the adhesive material may be placed on the entire surface of the magnetic sensor pattern array substrate 100 or the conductive pattern array substrate 200.

The conductive pattern array substrate 200 may include a second substrate 210 and a plurality of conductive patterns 130 disposed on the second substrate 210.

Like first substrate 110, the second substrate 210 may be made of an insulating material and a transparent material. In addition, the second substrate 210 may be a flexible substrate or rigid substrate. In one embodiment, the second substrate 210 may be made of polyimide (PI), polycarbonate (PC), polyethylene terephthalate (PET), polyethersulfone (PES), polyethylene naphthalate (PEN), metal foil, or fiber reinforced plastic (FRP). Alternatively, the second substrate 210 may be made of a glass material, a sapphire material, or a quartz material. Further, the second substrate 210 may be a transparent window. The transparent window may correspond to the outer shape of the touch sensing panel 11, and at least a region of the transparent window may be exposed to receive an input by a user's body part (e.g., a finger) or a stylus pen.

The conductive patterns 230 may be disposed on the second substrate 210 and may be placed to correspond to magnetic sensor patterns 130. In the drawings, the conductive patterns 230 correspond to respective ones of the magnetic sensor patterns 130. In another embodiment, a plurality of conductive patterns 230 may be placed to correspond to one magnetic sensor pattern 130, or one conductive pattern 230 may be placed to correspond to a plurality of magnetic sensor patterns 130.

The conductive patterns 230 may overlap the magnetic sensor patterns 130, to thereby form sensing cells. When one of the sensing cells is touched, e.g., by a finger, the capacitance of a corresponding the conductive pattern 230 may change. The current flowing through the conductive pattern 230 may also change according to the change in the capacitance of the conductive pattern 230. Also, the change in the current may cause a change in a magnetic field. The change in the magnetic field may be sensed by a corresponding magnetic sensor pattern 130. In this way, the touch input may be recognized.

The conductive patterns 230 may be made of a conductive material. The conductive material may include but is not limited to copper (Cu) or a Cu alloy. In addition, the conductive patterns 230 may be made of a transparent conducting material. The transparent conducting material may include but is not limited to indium tin oxide (ITO), indium zinc oxide (IZO), zinc oxide (ZO), carbon nanotubes, graphene, silver nanowires, or a metal mesh.

The conductive patterns 230 may have a variety of shapes. In the drawings, the conductive patterns 230 have a quadrilateral planar shape. In another embodiment, the conductive patterns 230 may have a triangle, a polygon, a circle, a semicircle, or an oval shape, or a combination of these shapes. The conductive patterns 230 may have the same or different shape as the magnetic sensor patterns 130. That is, the conductive patterns 230 may have any shape as long as it can form a sensing cell with a corresponding magnetic sensor pattern 130.

In one embodiment, an insulating layer 300 may be disposed between the magnetic sensor array substrate 100 and the conductive pattern array substrate 200. Alternatively, the insulating layer 300 may be omitted.

Also, in an alternative embodiment, the touch sensing panel 11 may include only one substrate. For example, the touch sensing panel 11 may be formed to have a structure in which the magnetic sensor patterns 130 are disposed on a surface of one substrate and the conductive patterns 230 are disposed on the other surface of the substrate. For illustrative purposes, a case where the magnetic sensor patterns 130 and the conductive patterns 230 are disposed on different substrates (e.g., first substrate 110 and second substrate 210) will be described.

The touch sensing apparatus 10 determines whether a touch event has occurred using magnetic sensor patterns 130. Therefore, the touch sensing apparatus 10 therefore may recognize not only a touch input from a user's body part, but also a touch input from a stylus pen 90 having a magnetic substance 91. More specifically, when a touch input by a finger 80 (e.g., a hand touch input) occurs, the touch sensing apparatus 10 may determine whether the touch input has occurred by sensing a change in a magnetic field using the magnetic sensor patterns 130. The change in magnetic field may result from a change in a current flowing through the conductive patterns 230.

When a touch input by the stylus pen 90 having the magnetic substance 91 (e.g., a pen touch input) occurs, the touch sensing apparatus 10 may determine whether the touch input has occurred by sensing a magnetic field generated by the magnetic substance 91, using the magnetic sensor patterns 130.

For example, the touch sensing apparatus 10 may detect a touch input both from a user's finger 80 and the stylus pen 90. In addition, because the touch sensing apparatus 10 detects different types of touch inputs (e.g., user's finger 80 and stylus pen 90) using one controller 13, the configuration of the touch sensing apparatus 10 can be simplified. Further, because there is no need to implement a circuit in the stylus pen 90, the configuration of the stylus pen 90 can also be simplified.

Figure 6:
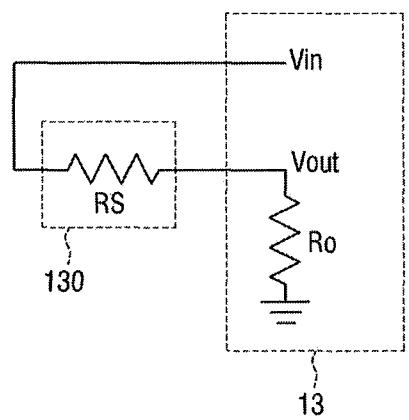
FIG. 6 illustrates a principle of operation of the apparatus in FIG. 1.

FIG. 6 illustrates a principle of operation of one embodiment of the touch sensing apparatus 10. Referring to FIG. 6, the controller 13 provides input power (e.g., input voltage Vin) to a magnetic sensor pattern 130 and receives output voltage Vout from the magnetic sensor pattern 130. In addition, the controller 13 obtains a sensing voltage Vs based on the input voltage Vin and output voltage Vout, and determines whether a touch input has occurred based on the sensing voltage Vs. If the resistance of the magnetic sensor pattern 130 is Rs and if the internal resistance or reference resistance of the controller 13 is Ro, the input voltage Vin and output voltage Vout may have the relationship defined by Equation (1), and the input voltage Vin and sensing voltage Vs may have the relationship defined by Equation (2):

$$Vout = Vin * Ro/(Rs+Ro) \quad (1)$$

$$Vs = Vin * Rs/(Rs+Ro) \quad (2)$$

The resistance Rs of the magnetic sensor pattern 130 may change according to a sensed magnetic field. In one embodiment, the value of Rs may increase as the size of the magnetic field increases. Because Vin and Ro are constant in Equation (1), the output voltage Vout and sensing voltage Vs change based on changes in Rs. More specifically, because the sensing voltage Vs changes based on a magnetic field sensed by the magnetic sensor pattern 130, the controller 13 may determine whether a touch input has occurred based on the sensing voltage Vs.

Figure 7:
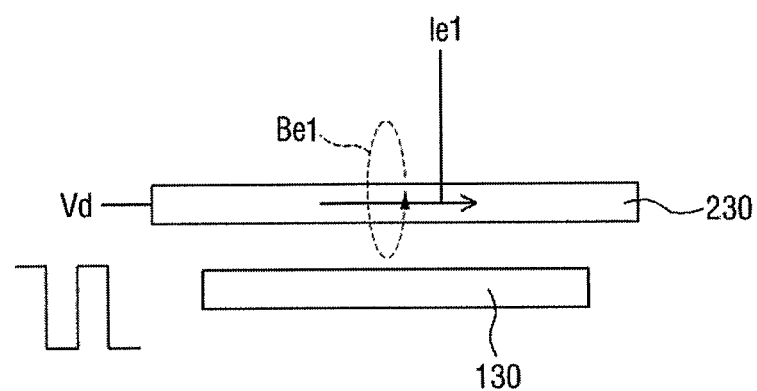
FIGS. 7 to 10 illustrate a touch sensing process for a hand touch input.
Figure 8:
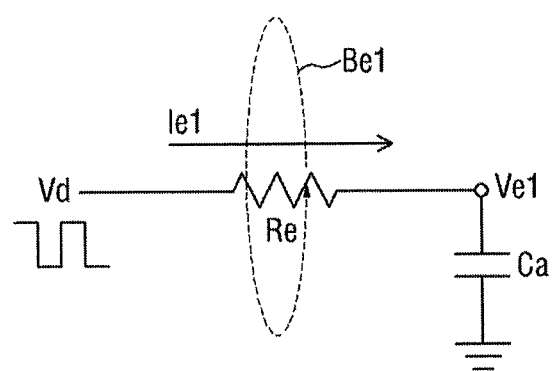
Figure 9:
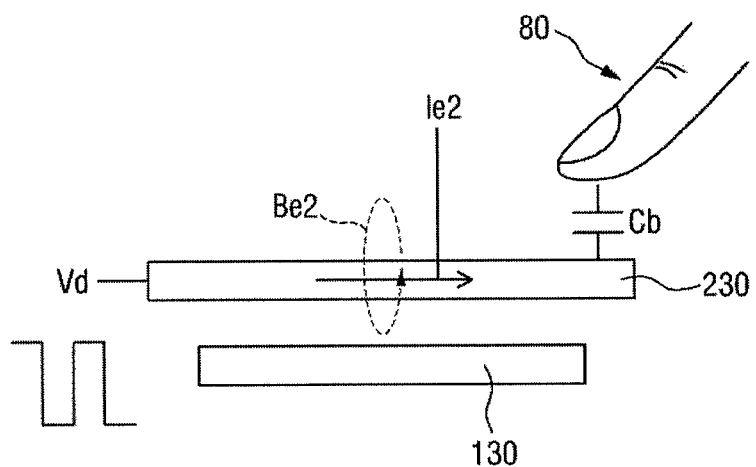
Figure 10:
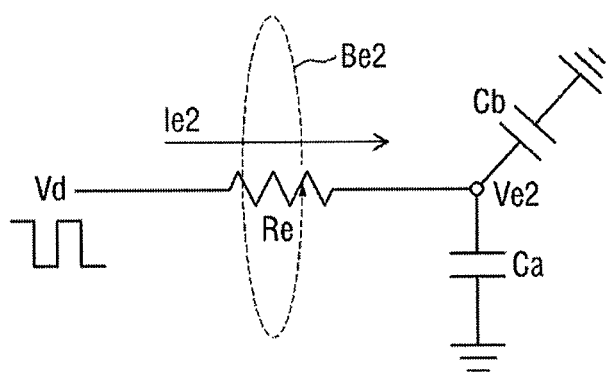

FIGS. 7 to 10 illustrate a touch sensing process for a hand touch input on the touch sensing apparatus 10. FIG. 7 illustrates voltage and current states of a conductive pattern 230 when a hand touch input has not occurred, and FIG. 8 is circuit diagram of FIG. 7. FIG. 9 illustrates voltage and current states of conductive pattern 230 when a hand touch input has occurred, and FIG. 10 is a circuit diagram of FIG. 9.

Referring to FIGS. 7 and 8, when the driving voltage Vd is applied to the conductive pattern 230, a current is formed in the conductive pattern 230, which, in turn, forms a magnetic field. For example, the resistance of the conductive pattern 230 may be Re and the capacitance formed in the conductive pattern 230 may be Ca when a hand touch input has not occurred. In this case, if a voltage (e.g., a voltage obtained after the driving voltage Vd is dropped by Re and Ca) of the conductive pattern 230 is Ve1, Vd and Ve1 have the relationship defined by Equation (3):

$$Ve1 = Vd * e^{-t/(Re*Ca)} \quad (3)$$

where t is time (in an exemplary embodiment, t is seconds).

If a current flowing through the conductive pattern 230 when a hand touch input has not occurred is Ie1, Ie1 may be given by Equation (4):

$$Ie1 = (Vd - Ve1)/Re = (Vd - Vd * e^{-tRe*Ca})/Re \quad 4)$$

where t is time (in an exemplary embodiment, t is seconds).

Further, a magnetic field may be formed around the conductive pattern 230 based on the current flowing through the conductive pattern 230. For example, a magnetic field Be1 may be formed around the conductive pattern 230 according to current Ie1 flowing through the conductive pattern 230 when a touch input by a finger has not occurred.

The intensity of a magnetic field is proportional to the magnitude of current and inversely proportional to a distance from a region where the current flows. Therefore, when the magnitude of current flowing through the conductive pattern 230 changes, the intensity of the magnetic field generated around the conductive pattern 230 also changes. In addition, because the distance between the conductive pattern 230 and a magnetic sensor pattern 130 is constant, the intensity of the magnetic field sensed by the magnetic sensor pattern 130 changes according to the magnitude of the current flowing through the conductive pattern 230.

Referring to FIGS. 9 and 10, when a hand touch input, e.g., by a finger 80 occurs, capacitance Cb is formed between conductive pattern 230 and finger 80. The capacitance Cb changes the voltage and current of the conductive pattern 230.

If the voltage (e.g., a voltage obtained after driving voltage Vd is dropped by Re, Ca, and Cb) of conductive pattern 230 changed by the hand touch input is Ve2, Vd and Ve2 may have the relationship defined by Equation (5):

$$Ve2 = Vd * e^{-t/\{Re*(Ca+Cb)\}} \quad (5)$$

where t is time (in an exemplary embodiment, t is seconds).

If a current flowing through the conductive pattern 230 when a hand touch input has occurred is Ie2, Ie2 may be given by Equation (6):

$$Ie2 = (Vd - Ve2)/Re = (Vd - Vd * e^{-t/\{Re*(Ca+Cb)\}})/Re \quad (6)$$

where t is time (in an exemplary embodiment, t is seconds).

For example, as described above, the capacitance Cb generated between the finger 80 and the conductive pattern 230 changes the voltage and current of the conductive pattern 230. Because the magnitude of a current and the intensity of a magnetic field are proportional to each other, when the current flowing through the conductive pattern 230 changes from Ie1 to Ie2, the magnetic field generated around the conductive pattern 230 also changes from Be1 to Be2.

For example, when a hand touch input occurs, the capacitance of the conductive pattern 230 changes, which changes the current flowing through the conductive pattern 230. In addition, the changed current changes the magnetic field formed around the conductive pattern 230. Because the distance between the magnetic sensor pattern 130 and the conductive pattern 230 is constant, a change in the magnetic field sensed by the magnetic sensor pattern 130 is based on a change in the current of the conductive pattern 230. The change in the magnetic field sensed by the magnetic sensor pattern 130 is used to determine whether a touch input has occurred.

Figure 11:
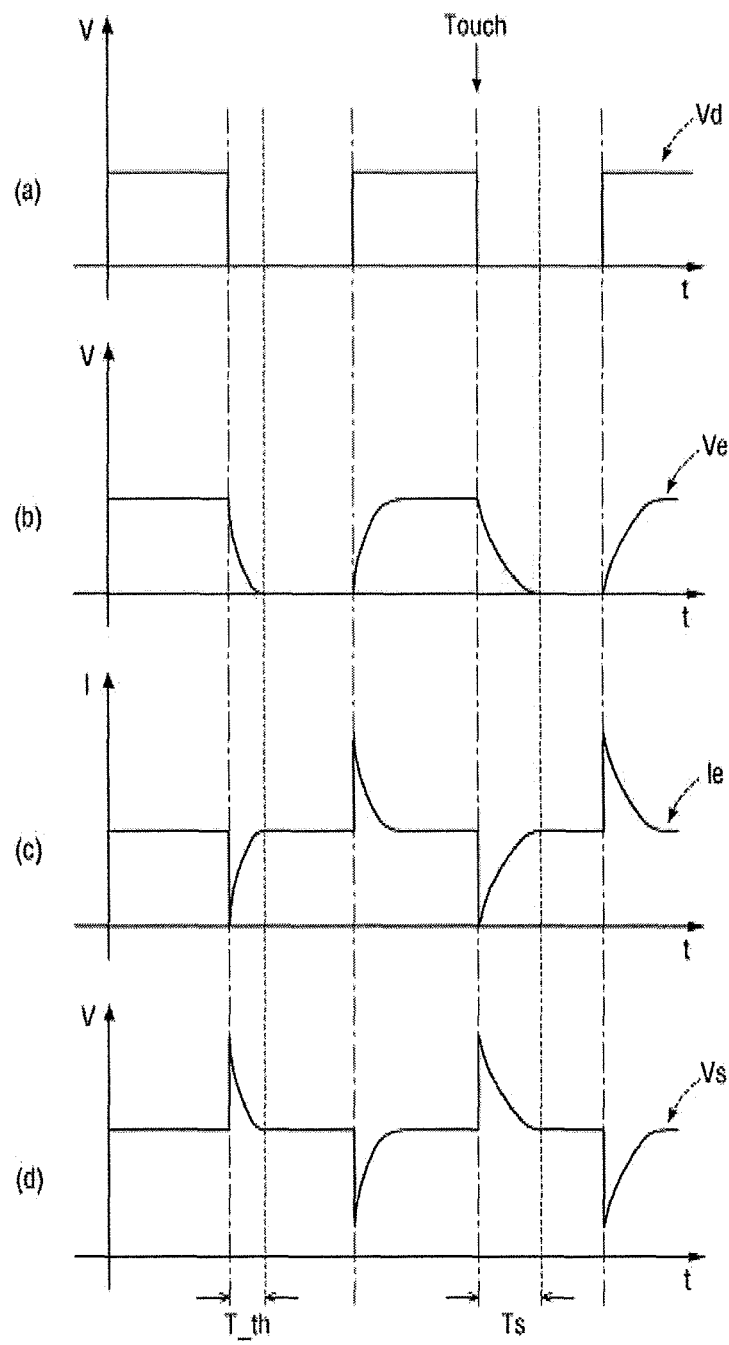
FIG. 11 illustrates a driving voltage applied to a conductive pattern, a current of the conductive pattern, and a sensing voltage obtained from a magnetic sensor pattern for a hand touch input.

FIG. 11 is a graph illustrating voltage and current when a hand touch input has occurred on the touch sensing apparatus 10. More specifically, FIG. 11(a) is a graph illustrating driving voltage Vd applied to a conductive pattern 230, FIG. 11(b) is a graph illustrating voltage Ve of conductive pattern 230, FIG. 11(c) is a graph illustrating current Ie of conductive pattern 230, and FIG. 11(d) is a graph illustrating the sensing voltage Vs obtained from a magnetic sensor pattern 130.

Referring to FIGS. 1 and 7 to 11, when the driving voltage Vd having a predetermined period is applied to the conductive pattern 230 as illustrated in FIG. 11(a), the voltage Ve of the conductive pattern 230 may have a waveform including a direct current (DC) component and an alternating current (AC) component, as illustrated in FIG. 11(b) due to resistance Re and capacitance Ca of the conductive pattern 230.

In addition, the current Ie of the conductive pattern 230 may have a waveform including a DC component and an AC component, as illustrated in FIG. 11(c), based on voltage Ve of the conductive pattern 230. The magnitude of a current and the intensity of a magnetic field are proportional to each other. The resistance value of the magnetic sensor pattern 130 increases in proportion to the intensity of the magnetic field. In addition, as the resistance value of the magnetic sensor pattern 130 increases, the magnitude of the sensing voltage Vs increases. Accordingly, the sensing voltage Vs may have a waveform, as illustrated in FIG. 11(d), and may also have a DC component and an AC component.

If a period of time during which the AC component of sensing voltage Vs exists when a hand touch input has not occurred is T_th, and if a period of time during which the AC component of the sensing voltage Vs measured by the controller 13 exists is Ts, Ts may have a greater value than T_th when a hand touch event occurs. This is due to the capacitance Cb generated between the conductive pattern 230 and finger 80. Therefore, if T_th is set as a threshold value (or a threshold time value), the controller 13 may obtain the period of time Ts during which the AC component of the sensing voltage Vs exists. Controller 13 may then compare the period of time Ts with T_th. When Ts is greater than T_th, the controller 13 may determine that a touch input has occurred, and moreover that a hand touch input has occurred.

The threshold time value may change. For example, the threshold time value may be set to a period of time required for the sensing voltage Vs to change from a maximum value to a specific level within one period, or from a minimum value to the specific level within one period. In one embodiment, the specific level may be 63.2% of the maximum value within one period. In this case, the threshold time value may be a time constant.

When the threshold time value changes, a measured value (or a measured time value) by the controller 13 may also change. For example, if the threshold time value is set to a period of time required for sensing voltage Vs to change from the maximum value to the minimum value within one period when a hand touch input has not occurred, controller 13 may use the period of time required for the sensing voltage Vs to change from the maximum value to the minimum value as the measured time value.

Likewise, if the threshold time value is set to a period of time required for the sensing voltage Vs to change from the maximum value to a specific level, or from the minimum value to the specific level, within one period when a hand touch input has not occurred, the controller 13 may use the period of time required for the sensing voltage Vs to change from the maximum value to the specific level, or from the minimum value to the specific level, as the measured time value. Then, the controller 13 may use the measured time value to determine whether a touch event has occurred.

Figure 12:
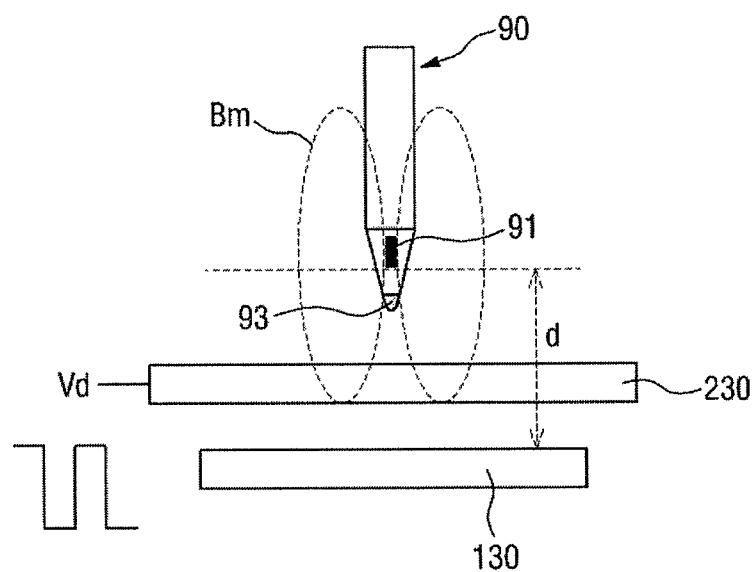
FIGS. 12 and 13 illustrate a touch sensing process for a pen touch.
Figure 13:
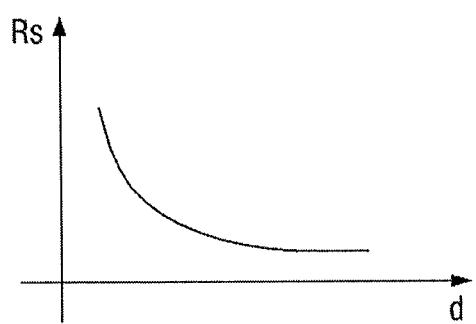

FIGS. 12 and 13 illustrate a touch sensing process when a pen touch input has occurred on the touch sensing apparatus 10. Referring to FIGS. 1, 12 and 13, when a touch input by the stylus pen 90 (e.g., pen touch input) occurs on the touch sensing apparatus 10, the pen touch input may be sensed using the magnetic sensor pattern 130.

The stylus pen 90 may include the magnetic substance 91 that generates magnetic field Bm. The magnetic substance 91 may be a permanent magnet. The stylus pen 90 may have any shape, as long as it includes the magnetic substance 91 which generates magnetic field Bm. The stylus pen 90 does not require an electronic circuit and a battery. Therefore, the stylus pen 90 can be manufactured at a low cost and has no battery consumption. The stylus pen 90 may include an elastic tip 93 at one end.

When the stylus pen 90 approaches the touch sensing apparatus 10, the magnetic sensor pattern 130 senses magnetic field Bm generated by the magnetic substance 91. More specifically, as the distance d between the magnetic substance 91 and the magnetic sensor pattern 130 decreases, the resistance Rs of magnetic sensor pattern 130 increases. For example, the distance d between the magnetic substance 91 and the magnetic sensor pattern 13 may be inversely proportional to the resistance Rs of magnetic sensor pattern 130, as illustrated in FIG. 13. Therefore, as the distance d between magnetic substance 91 and magnetic sensor pattern 130 decreases, the intensity of the magnetic field Bm sensed by the magnetic sensor pattern 130 increases. As a result, the resistance Rs of magnetic sensor pattern 130 may increase. Because sensing voltage Vs obtained by the controller 13 changes based on the resistance Rs of the magnetic sensor pattern 130, the controller 13 may determine whether a touch input has occurred based on the sensing voltage Vs.

When the stylus pen 90 includes the elastic tip 93 at one end, the distance d between the magnetic substance 91 and the magnetic sensor pattern 13 may change more significantly. Accordingly, the controller 13 may determine not only whether a touch input by the stylus pen 90 has occurred, but also the intensity of pen pressure.

FIGS. 14(a)-(d) are graphs illustrating voltage and current when a pen touch input has occurred on touch sensing apparatus 10 of FIG. 1. FIG. 14(a) is a graph illustrating the driving voltage Vd applied to a conductive pattern 230, FIG. 14(b) is a graph illustrating the voltage Ve of conductive pattern 230, FIG. 14(c) is a graph illustrating the current Ie of conductive pattern 230, and FIG. 14(d) is a graph illustrating the sensing voltage Vs obtained from magnetic sensor pattern 130.

Figure 14:
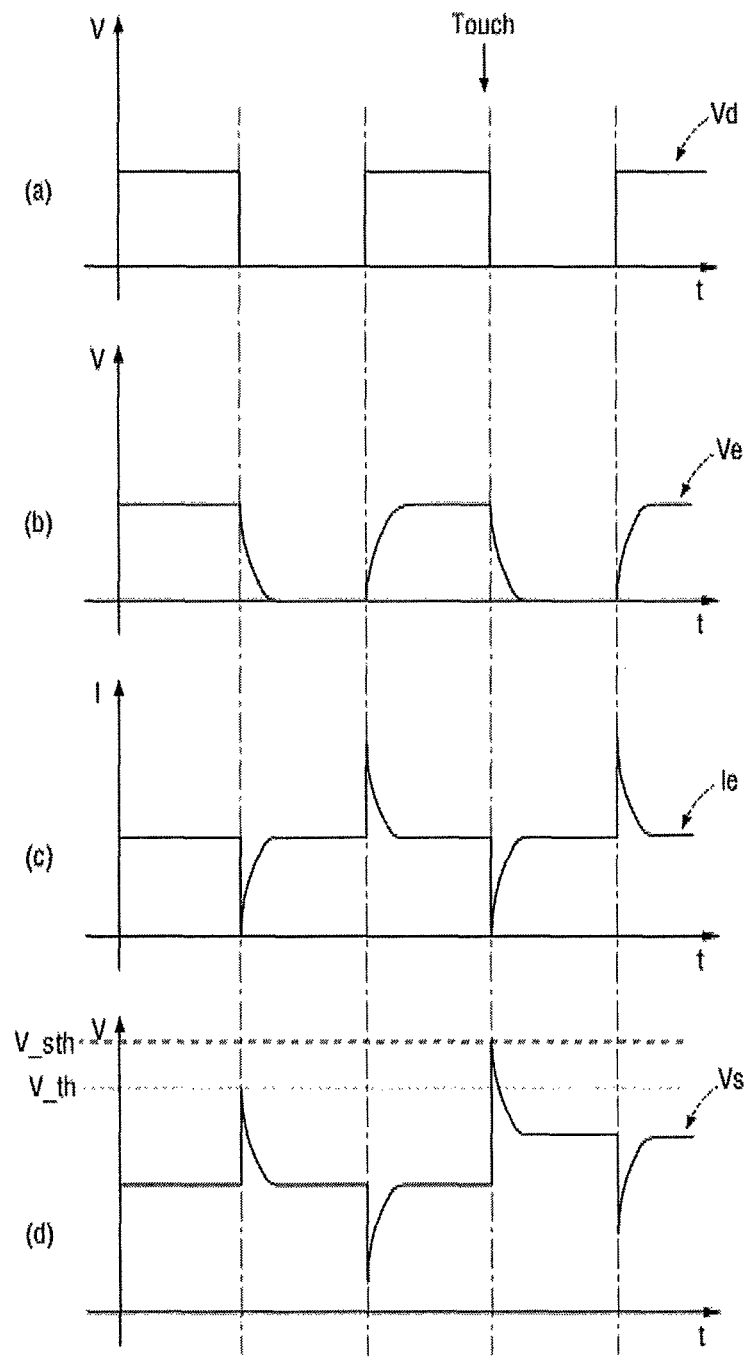
FIG. 14 illustrates a driving voltage applied to a conductive pattern, a current of the conductive pattern, and a sensing voltage obtained from a magnetic sensor pattern for a pen touch.

Referring to FIGS. 1 and 12 through 14, when the driving voltage Vd having a predetermined period is applied to conductive pattern 230 as illustrated FIG. 14(a), the voltage Ve of the conductive pattern 230 may have a waveform including a DC component and an AC component, as illustrated in FIG. 14(b), due to the resistance Re and the capacitance Ca of the conductive pattern 230. In addition, the current Ie of the conductive pattern 230 may have a waveform including a DC component and an AC component as illustrated in FIG. 14(c) based on the voltage Ve of conductive pattern 230. The magnitude of current and the intensity of the magnetic field are proportional to each other, and the resistance value of the magnetic sensor pattern 130 increases in proportion to the intensity of the magnetic field. In addition, as the resistance value of the magnetic sensor pattern 130 increases, the magnitude of the sensing voltage Vs increases. Accordingly, the sensing voltage Vs may have a waveform as illustrated in FIG. 14(d) and may also have a DC component and an AC component.

If a maximum value of the sensing voltage Vs in a case where a pen touch input has not occurred is V_th, and if a maximum value of the sensing voltage Vs measured by the controller 13 is V_sth, V_sth may have a greater value than V_th when a pen touch event occurs. This is due to the magnetic field Bm generated by the magnetic substance 91 of the stylus pen 90. Therefore, if V_th is set as a threshold value (or a threshold size value), the controller 13 may obtain the maximum value V_sth of the size of the sensing voltage Vs as a measured value (or a measured size value), and may compare the maximum value V_sth with V_th. When V_sth is greater than V_th, controller 13 may determine that a pen touch input has occurred.

In other embodiments, the threshold size value may be set to a mean or median value of the size of sensing voltage Vs calculated within one period, in a case where a pen touch input has not occurred, or may be set to other values.

When the threshold size value is changed, the size value measured by the controller 13 may also change. For example, if the threshold size value is set to a mean value of the size of the sensing voltage Vs within one period in a case where a pen touch input has not occurred, controller 13 may obtain the mean value of the size of the sensing voltage Vs within one period and then use this mean value as the measured size value.

When the threshold time value is set to a period of time required for the sensing voltage Vs to change from a maximum value to a specific level, or from a minimum value to the specific level, within one period in a case where a hand touch input has not occurred, the controller 13 may obtain the period of time required for the sensing voltage Vs to change from the maximum value to the specific level, or from the minimum value to the specific level. The controller 13 may then use this period of time as Ts.

When the threshold size value is set to a median value of the size of sensing voltage Vs within one period in a case where a pen touch input has not occurred, the controller 13 may obtain the median value of the size of the sensing voltage Vs within one period, and then may use the median value as the measured size value.

Figure 15:
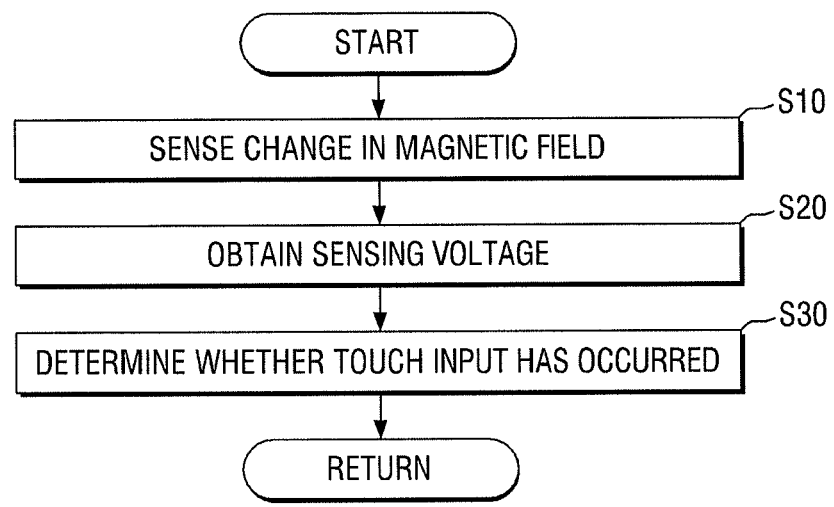
FIG. 15 illustrates an embodiment of a touch sensing method.

FIG. 15 illustrates an embodiment of a touch sensing method which includes sensing a change in magnetic field caused by a touch input (operation S10), obtaining a sensing voltage based on the change in the magnetic field (operation S20), and determining whether the touch input has occurred based on the obtained sensing voltage (operation S30).

The sensing of the change in the magnetic field caused by the touch input may be performed by a magnetic sensor pattern. The magnetic sensor pattern may be a magneto-resistance device, having a resistance which changes according to a change in a magnetic field or may be a hall-resistance device.

Obtaining the sensing voltage based on the change in magnetic field (operation S12) may be performed by a controller. In one embodiment, the sensing voltage may be obtained by calculating a difference value between an input voltage applied to the magnetic sensor pattern and an output voltage of the magnetic sensor pattern. The operation performed by the controller for obtaining the sensing voltage has previously been described.

Determining whether the touch input has occurred based on the obtained sensing voltage (operation S30) will now be described with reference to FIGS. 16 through 19.

Figure 16:
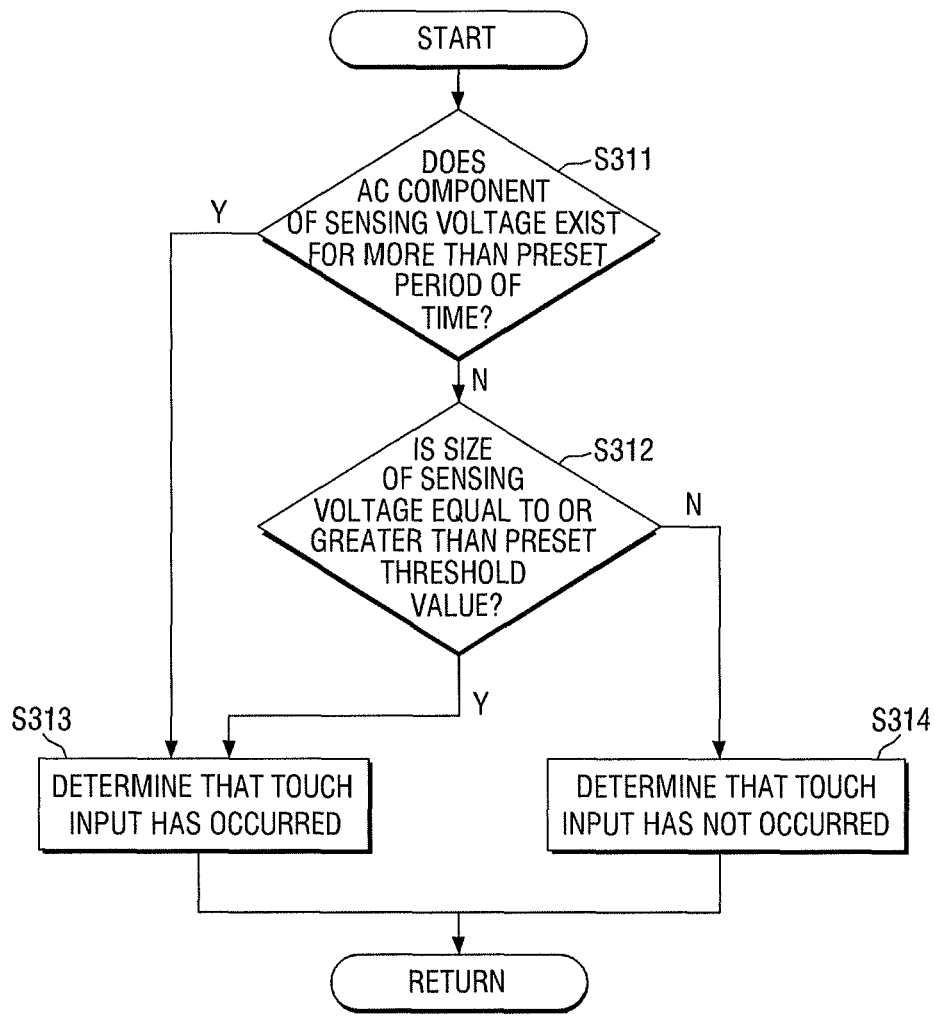
FIG. 16 illustrates an embodiment of a process for determining whether a touch input has occurred.

FIG. 16 illustrates an embodiment of a process for determining whether the touch input has occurred (operation S30) in FIG. 15. Referring to FIG. 16, determining whether the touch input has occurred (operation S30) may include determining whether an AC component of the sensing voltage exists for more than a preset period of time (operation S311), and determining that a touch input has occurred when the AC component of the sensing voltage exists for more than the preset period of time (operation S313).

If it is determined in operation S311 that the AC component of the sensing voltage does not exist for more than the preset period of time, a determination may be made as to whether the size of the sensing voltage is equal to or greater than a preset threshold value (operation S312). If it is determined in operation S312 that the size of the sensing voltage is equal to or greater than the preset threshold value, it may be determined that a touch input has occurred (operation S313). On the other hand, if it is determined in operation S312 that the size of the sensing voltage is smaller than the preset threshold value, it may be determined that a touch input has not occurred (operation S314). The above processes may be performed by the controller of a touch sensing apparatus.

Figure 17:
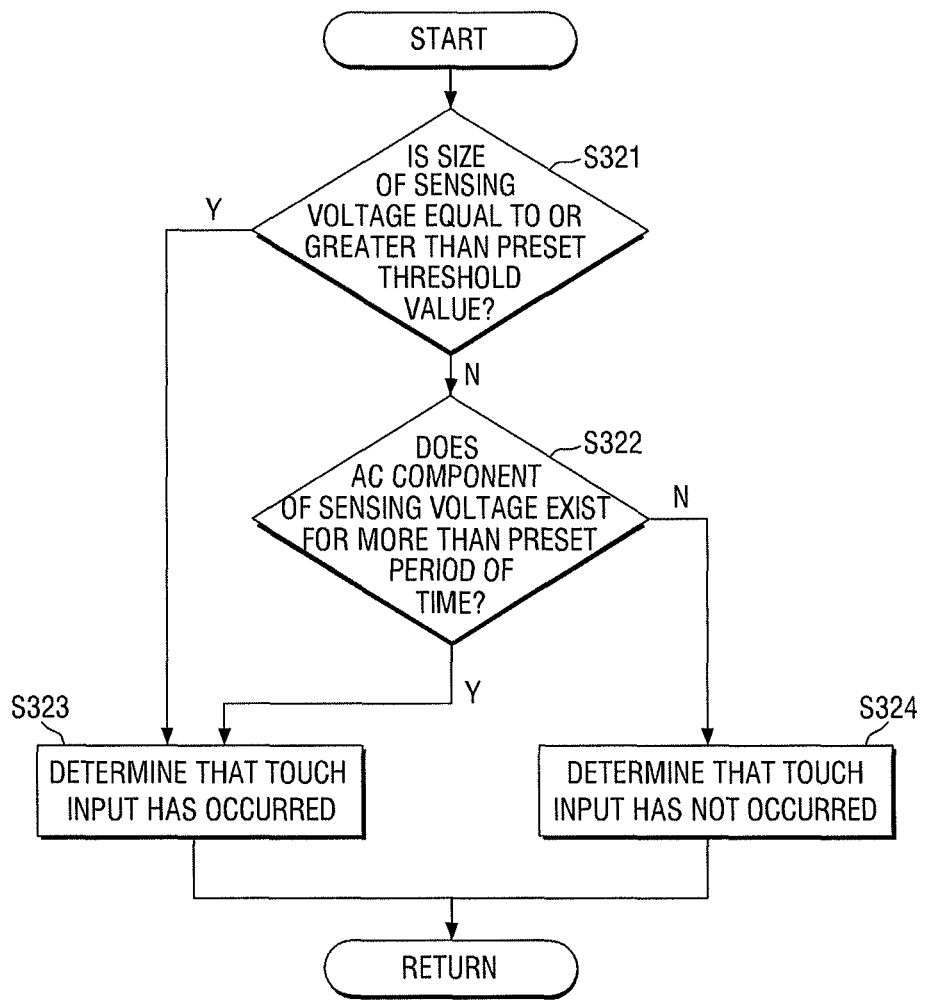
FIG. 17 illustrates another embodiment of a process for determining whether a touch input has occurred.

FIG. 17 illustrates another embodiment of a process for determining of whether the touch input has occurred (operation S30) in FIG. 15. Referring to FIG. 17, determining whether the touch input has occurred (operation S30) may include determining whether the size of the sensing voltage is equal to or greater than a preset threshold value (operation S321), and then determining that a touch input has occurred if the size of the sensing voltage is equal to or greater than the preset threshold value (operation S323).

If it is determined in operation S321 that the size of the sensing voltage is smaller than the preset threshold value, it may be determined whether the AC component of the sensing voltage exists for more than a preset period of time (operation S322). If it is determined in operation S322 that the AC component of the sensing voltage exists for more than the preset period of time, it may be determined that a touch input has occurred (operation S323). On the other hand, if it is determined in operation S322 that the AC component of the sensing voltage does not exist for more than the preset period of time, it may be determined that a touch input has not occurred (operation S324).

Therefore, determining whether the touch input has occurred (operation S30) according to the current embodiment is different from the determining of whether the touch input has occurred (operation S30) according to the previous embodiment of FIG. 16, in that determining whether the size of the sensing voltage is equal to or greater than the preset threshold value is performed before determining whether the AC component of the sensing voltage exists for more than the preset period of time.

Figure 18:
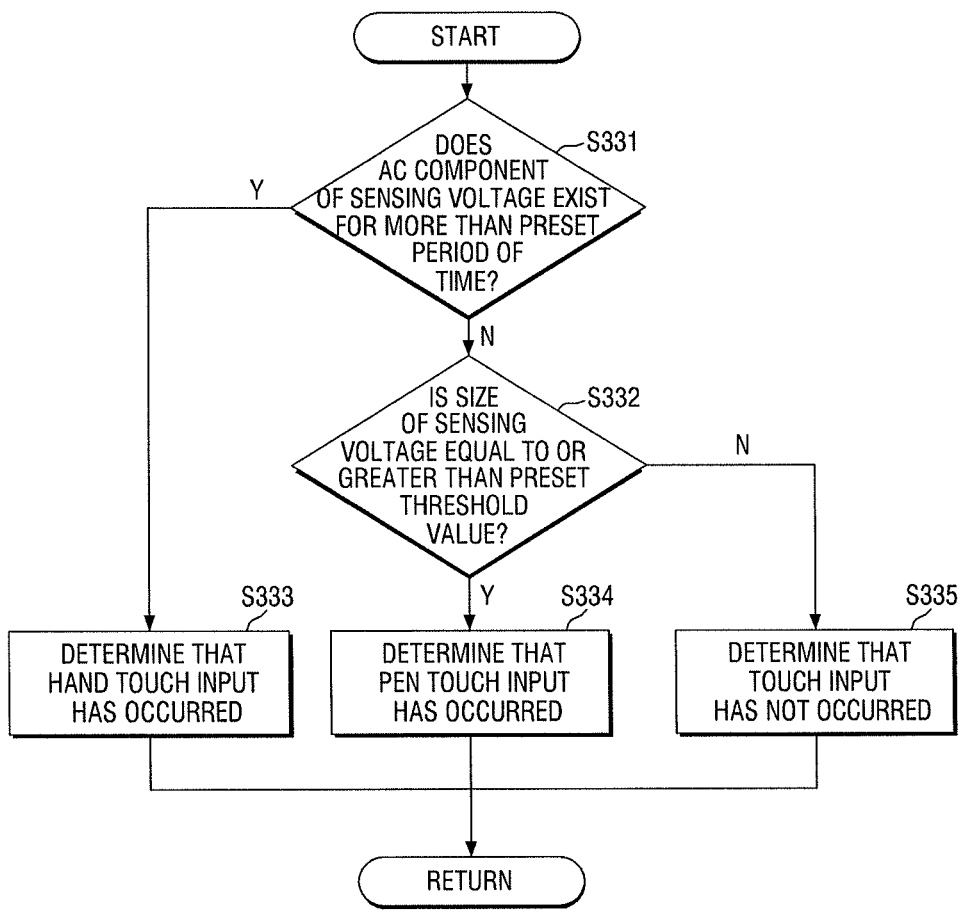
FIG. 18 illustrates another embodiment of a process for determining whether a touch input has occurred.

FIG. 18 illustrates another embodiment of a process for determining of whether the touch input has occurred (operation S30) in FIG. 15. Referring to FIG. 18, determining whether the touch input has occurred (operation S30) may include determining whether the AC component of the sensing voltage exists for more than a preset period of time (operation S331), A hand touch input is determined to have occurred if the AC component of the sensing voltage exists for more than the preset period of time.

If it is determined in operation S331 that the AC component of the sensing voltage does not exist for more than the preset period of time, it may be determined whether the size of the sensing voltage is equal to or greater than a preset threshold value (operation S332). If it is determined in operation S332 that the size of the sensing voltage is equal to or greater than the preset threshold value, it may be determined that a pen touch input has occurred (operation S334). On the other hand, if it is determined in operation S332 that the size of the sensing voltage is less than the preset threshold value, it may be determined that a touch input has not occurred (operation S335).

Therefore, determining whether the touch input has occurred (operation S30) according to the current embodiment is different from determining whether the touch input has occurred (operation S30) according to the previous embodiment of FIG. 16, in that types of touch inputs are distinguished in the current embodiment.

Figure 19:
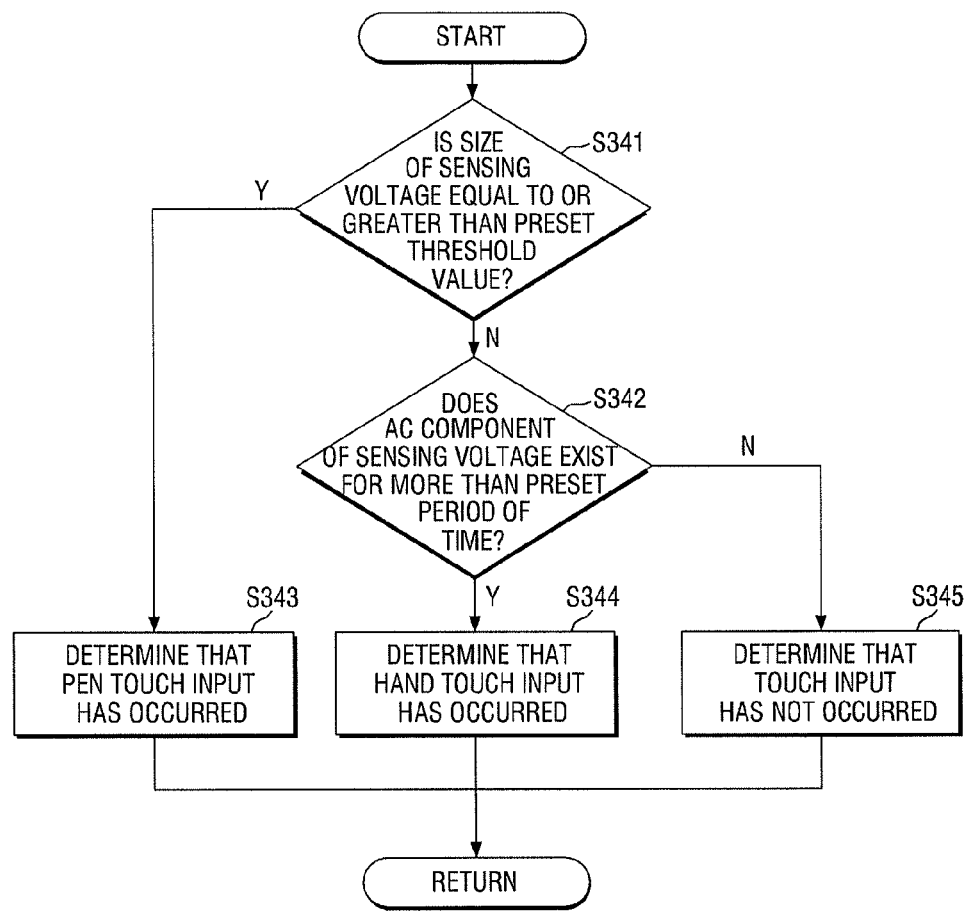
FIG. 19 illustrates the process of determining whether a touch input has occurred relating to FIG. 15.

FIG. 19 illustrates an embodiment of a process for determining of whether the touch input has occurred (operation S30) in FIG. 15. Referring to FIG. 19, determining whether the touch input has occurred (operation S30) may include determining whether the size of the sensing voltage is equal to or greater than a preset threshold value (operation S341), and then determining that a pen touch input has occurred if the size of the sensing voltage is equal to or greater than the preset threshold value (operation S341). If it is determined in operation S341 that the size of the sensing voltage is smaller than the preset threshold value, it may be determined whether the AC component of the sensing voltage exists for more than a preset period of time (operation S342).

If it is determined in operation S342 that the AC component of the sensing voltage exists for more than the preset period of time, it may be determined that a hand touch input has occurred (operation S344). On the other hand, if it is determined in operation S342 that the AC component of the sensing voltage does not exist for more than the preset period of time, it may be determined that a touch input has not occurred (operation S345).

Therefore, determining whether the touch input has occurred (operation S30) according to the current embodiment is different from determining whether the touch input has occurred (operation S30) according to the previous embodiment of FIG. 18, in that determining whether the size of the sensing voltage is equal to or greater than the preset threshold value is performed before determining whether the AC component of the sensing voltage exists for more than the preset period of time.

In accordance with one or more of the aforementioned embodiments, a touch sensing apparatus and method are provided which can detect touch input from both a user's finger and a stylus pen. These and/or other embodiments provide a touch sensing apparatus and method which can detect a touch input from a stylus pen that does not include a circuit.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A touch sensing apparatus, comprising:
   a first substrate;
   a plurality of magnetic sensor patterns coupled to the first substrate, each of the magnetic sensor patterns to sense a change in a magnetic field caused by a touch input; and
   a plurality of conductive patterns corresponding to the magnetic sensor patterns,
   wherein the magnetic sensor patterns overlap respective ones of the conductive patterns to form corresponding sensing cells, each magnetic sensor pattern to sense magnetic field changes produced by a change in current in a corresponding conductive pattern to detect the touch input, and wherein each magnetic sensor pattern is to output:
   a first signal corresponding to the change in magnetic field caused by the touch input, the change in magnetic field produced by the change in current in at least one of the conductive patterns, and
   a second signal corresponding to a magnetic field generated by a stylus pen.

2. The apparatus as claimed in claim 1, further comprising:
   a controller to determine whether the touch input has occurred based on the change in the magnetic field.

3. The apparatus as claimed in claim 2, wherein the controller:
   obtains a sensing voltage corresponding to the first signal generated by the magnetic sensor patterns based on the change in the magnetic field, and
   determines whether the touch input has occurred based on the sensing voltage.

4. The apparatus as claimed in claim 3, wherein the controller determines that the touch input has occurred when an alternating current (AC) component of the sensing voltage exists for more than a preset period of time.

5. The apparatus as claimed in claim 4, wherein the change in the magnetic field is based on a change in capacitance of the at least one of the conductive patterns caused by the touch input, the change in capacitance causing the change in the current in at least one of the conductive patterns.

6. The apparatus as claimed in claim 4, wherein the controller determines the touch input to be a hand touch input when the AC component of the sensing voltage exists for more than the preset period of time.

7. The apparatus as claimed in claim 3, wherein the controller determines that the touch input has occurred when a size of the sensing voltage is equal to or greater than a preset threshold value.

8. The apparatus as claimed in claim 7, wherein the change in the magnetic field is based on a magnetic field generated by the touch input.

9. The apparatus as claimed in claim 3, wherein the controller determines the touch input to be an input from the stylus pen when a sensing voltage corresponding to the second signal is generated for more than a preset period of time.

10. The apparatus as claimed in claim 2, further comprising: a read-out line to electrically connect each of the magnetic sensor patterns to the controller.

11. The apparatus as claimed in claim 1, further comprising:
    an input power line to provide power to the magnetic sensor patterns.

12. The apparatus as claimed in claim 1, further comprising:
    a driving power line to provide driving power to the conductive patterns.

13. The apparatus as claimed in claim 1, wherein each of the magnetic sensor patterns includes a magneto-resistance device or a hall-resistance device.

14. The apparatus as claimed in claim 1, further comprising:
    a second substrate facing the first substrate,
    wherein the conductive patterns are coupled to a surface of the second substrate.

15. The apparatus as claimed in claim 14, further comprising:
    an insulating layer between the first substrate and the second substrate.

16. A touch sensing method, the method comprising:
    obtaining a first sensing signal based on a change in a magnetic field caused by a touch input, the change in magnetic field produced by a change in current in at least one of a plurality of conductive patterns that overlap a plurality of magnetic sensor patterns forming sensing cells;
    obtaining a second sensing signal corresponding to a magnetic field generated by a stylus pen, the second sensing signal obtained from a magnetic sensor pattern that output the first signal; and
    determining whether the touch input has occurred based on the first sensing signal, and determining whether an input from the stylus pen has occurred based on the second sensing signal.

17. The method as claimed in claim 16, wherein determining whether the touch input has occurred includes determining that the touch input has occurred when an AC component of the first sensing signal exists for more than a preset period of time.

18. The method as claimed in claim 17, wherein determining whether the touch input has occurred includes determining the touch input to be a hand touch input when the AC component of the first sensing signal exists for more than the preset period of time.

19. The method as claimed in claim 16, wherein determining whether the touch input has occurred includes determining that the touch input has occurred when a size of the first sensing signal is equal to or greater than a preset threshold value.

20. The method as claimed in claim 19, wherein determining whether the stylus pen input has occurred when the size of the second sensing signal is equal to or greater than the preset threshold value.

21. A touch sensing apparatus comprising:
a first substrate;
a plurality of sensing cells;
a plurality of magnetic sensor patterns coupled to the first substrate, each of the magnetic sensor patterns to sense a change in a magnetic field caused by a touch input; and
a plurality of conductive patterns corresponding to the magnetic sensor patterns,
wherein each of the sensing cells includes at least one of the magnetic sensor patterns and at least one of the conductive patterns, the at least one magnetic sensor pattern overlapping the at least one conductive pattern, and
wherein each magnetic sensor pattern is to output:
a first signal corresponding to the change in magnetic field caused by the touch input, the change in magnetic field produced by a change in current in at least one of the conductive patterns, and
a second signal corresponding to a magnetic field generated by a stylus pen.

* * * * *